United States Patent
Olson

(10) Patent No.: US 7,888,917 B2
(45) Date of Patent: Feb. 15, 2011

(54) SYSTEMS AND METHODS FOR PRODUCING A SUBSTANTIALLY CONSTANT OUTPUT VOLTAGE IN A POWER SOURCE BOOST SYSTEM

(75) Inventor: Scot Olson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 493 days.

(21) Appl. No.: 12/108,408

(22) Filed: Apr. 23, 2008

(65) Prior Publication Data

US 2009/0267574 A1 Oct. 29, 2009

(51) Int. Cl.
*G05F 1/46* (2006.01)
(52) U.S. Cl. .................. 323/222; 323/285; 323/299
(58) Field of Classification Search .............. 323/222, 323/285, 299
See application file for complete search history.

(56) References Cited

U.S. PATENT DOCUMENTS

| | | | |
|---|---|---|---|
| 4,536,700 A | 8/1985 | Bello et al. | |
| 4,678,983 A * | 7/1987 | Rouzies | 323/222 |
| 5,359,276 A | 10/1994 | Mammano | |
| 5,594,323 A | 1/1997 | Herfurth et al. | |
| 5,932,938 A | 8/1999 | Shimamori | |
| 5,982,156 A | 11/1999 | Weimer et al. | |
| 6,744,241 B2 | 6/2004 | Feldtkeller | |
| 6,917,185 B2 | 7/2005 | Okamoto | |
| 7,279,878 B2 * | 10/2007 | Ootani et al. | 323/285 |
| 7,397,678 B2 * | 7/2008 | Frank et al. | 363/89 |
| 7,514,913 B2 * | 4/2009 | Zhang et al. | 323/299 |
| 7,675,280 B2 * | 3/2010 | Strijker | 323/285 |
| 2002/0196006 A1 | 12/2002 | Hwang | |
| 2006/0208718 A1 | 9/2006 | Nitta et al. | |
| 2007/0096711 A1 | 5/2007 | Ishii et al. | |

* cited by examiner

*Primary Examiner*—Jeffrey L Sterrett
(74) *Attorney, Agent, or Firm*—Ingrassia Fisher & Lorenz, P.C.

(57) ABSTRACT

Systems and methods for producing a substantially constant output voltage in a power source boost system are provided. A power supply boost circuit includes an output node for supplying an output voltage, a feed forward loop configured to be coupled to a load and a power source, and a feedback loop including a voltage limiter coupled to the feed forward loop and the output node. One power source boost system includes the above power source boost coupled to a load and a power source. A method includes the steps of comparing, via a feedback loop, a constant voltage to a reference voltage, and stabilizing a power source boost system over a range of input voltages and load variations. The stabilizing step includes the step of limiting, via a limiter, a voltage supplied to a feed forward loop to a predetermined range of voltages based on the comparing step.

19 Claims, 3 Drawing Sheets

SYSTEMS AND METHODS FOR PRODUCING A SUBSTANTIALLY CONSTANT OUTPUT VOLTAGE IN A POWER SOURCE BOOST SYSTEM

TECHNICAL FIELD

The present invention generally relates to power supplies, and more particularly relates to power source boost systems and methods for producing a substantially constant output voltage in a power source boost system.

BACKGROUND

Power source boost systems are frequently used in, for example, aircraft display power supplies to generate voltages greater than the supply voltage for the aircraft. In contemporary aircraft displays, power source boost systems drive strings of light-emitting diodes (LEDs) in the backlights of such aircraft displays. One challenge in designing power source boost systems in, for example, aircraft displays is creating a power source boost system that is highly stable over a wide range of input voltages and output loads.

Accordingly, it is desirable to provide power source boost systems and methods for producing a substantially constant output voltage in a power source boost system. In addition, it is desirable to provide power source boost systems and methods that produce an output voltage that is not a function of the input voltage and/or the output load. Furthermore, other desirable features and characteristics of the present invention will become apparent from the subsequent detailed description of the invention and the appended claims, taken in conjunction with the accompanying drawings and this background of the invention.

BRIEF SUMMARY

Various exemplary embodiments provide a power supply boost circuit capable of being coupled to a power source and a load. One power supply boost circuit comprises an output node configured to be coupled to the load and to the power source, and for supplying an output voltage, a feed forward loop configured to be coupled to the load and the power source, and a feedback loop comprising a voltage limiter coupled to the feed forward loop and the output node.

Other embodiments provide a system comprising a voltage source, a power supply boost circuit, and a load coupled the voltage source and the power supply boost circuit. The power supply boost circuit comprises an output node for supplying an output voltage, a feed forward loop coupled to the voltage source, and a feedback loop coupled to the output node, the feedback loop comprising a voltage limiter coupled to the feed forward loop.

Methods for producing a substantially constant voltage at an output of a power source boost system coupled to a load, the power source boost system including a feedback loop comprising a limiter coupled to the output and a feed forward loop coupled the limiter, the load, and the power source are also provided. One method comprises the steps of comparing, via the feedback loop, the constant voltage to a reference voltage; and stabilizing the power source boost system over a range of input voltages and load variations. In one embodiment, the stabilizing step comprises the step of limiting, via the limiter, a voltage supplied to the feed forward loop to a predetermined range of voltages based on the comparing step.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various embodiments of the present invention provide feed forward power source boost systems and methods for producing a substantially constant output voltage in a power source boost system. That is, the various embodiments provide feed forward power source boost systems and/or methods that produce an output voltage that is not a function of the input voltage and/or the output load.

Figure 1:
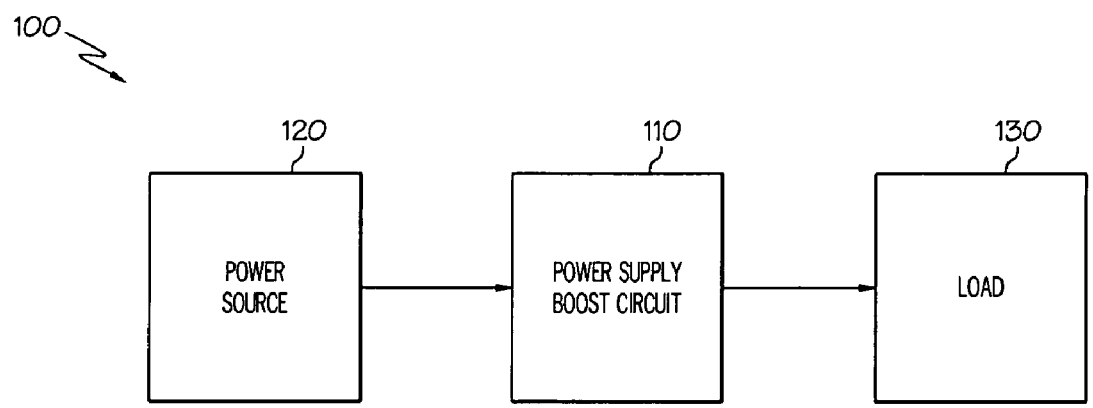
FIG. 1 is a block diagram of one exemplary embodiment of a display system.

FIG. 1 is a block diagram of one exemplary embodiment of a display system 100. In the illustrated embodiment, display system 100 comprises a power supply boost circuit ("boost circuit") 110 coupled to a power source 120 and a load 130.

Boost circuit 110 is configured to receive a supply voltage from power source 120 and amplify the supply voltage to generate a substantially constant output voltage. That is, boost circuit 110 is configured to generate substantially the same output voltage regardless of the amount of supply voltage and/or output load (i.e., the load created by display 130). In various exemplary embodiments, boost circuit 110 is configured to generate a substantially constant or consistent output voltage, which voltage may be any voltage needed for a particular application. A particular preferred embodiment of boost circuit 110 will be discussed in more detail below.

Power source 120 may be any hardware, device, and/or system capable of generating a supply voltage and providing the voltage to boost circuit 110. That is, power source 120 may be a battery or other type of device or apparatus capable of generating and/or storing power. In one embodiment, power source 120 produces an arbitrary voltage signal capable of providing the required load power, and whose voltage variations occur over a period of time longer than the period of a cycle of operation of the boost supply.

Load 130 may be any hardware, device, and/or system that may require a greater voltage to operate than is generated by power source 120. That is, power source 120 is capable of supplying enough power to boost circuit 110 to operate load 130. In various embodiments, load 130 may be any hardware, device, and/or system capable of presenting a representation, visual and/or otherwise, of data to a user. That is, load 130 may be a display, a computing device, and/or other electronic hardware/device/system. Exemplary displays include, but are not limited to, light-emitting diode (LED) displays, organic light-emitting diode (OLED) displays, cathode ray tube (CRT) displays, plasma display panel (PDP) display, liquid crystal displays (LCDs), thin-film transistor (TFT) displays, high performance addressing (HPA) displays, electroluminescent displays (ELDs), surface-conduction electron-emitter displays (SEDs), laser optoelectronic displays, carbon nanotube (CNT) displays, nanocrystal displays, and the like displays. In various embodiments, display 130 is configured for use on aircraft platforms (e.g., airplanes, helicopters, spacecraft, satellites, and the like aircraft), terrestrial vehicles (e.g., military vehicles, automobiles, trucks, trains, farm equipment, construction equipment, and the like vehicles), and watercraft (e.g., ships (e.g., military, commercial, etc.), submarines, boats, and the like watercraft).

Figure 2:
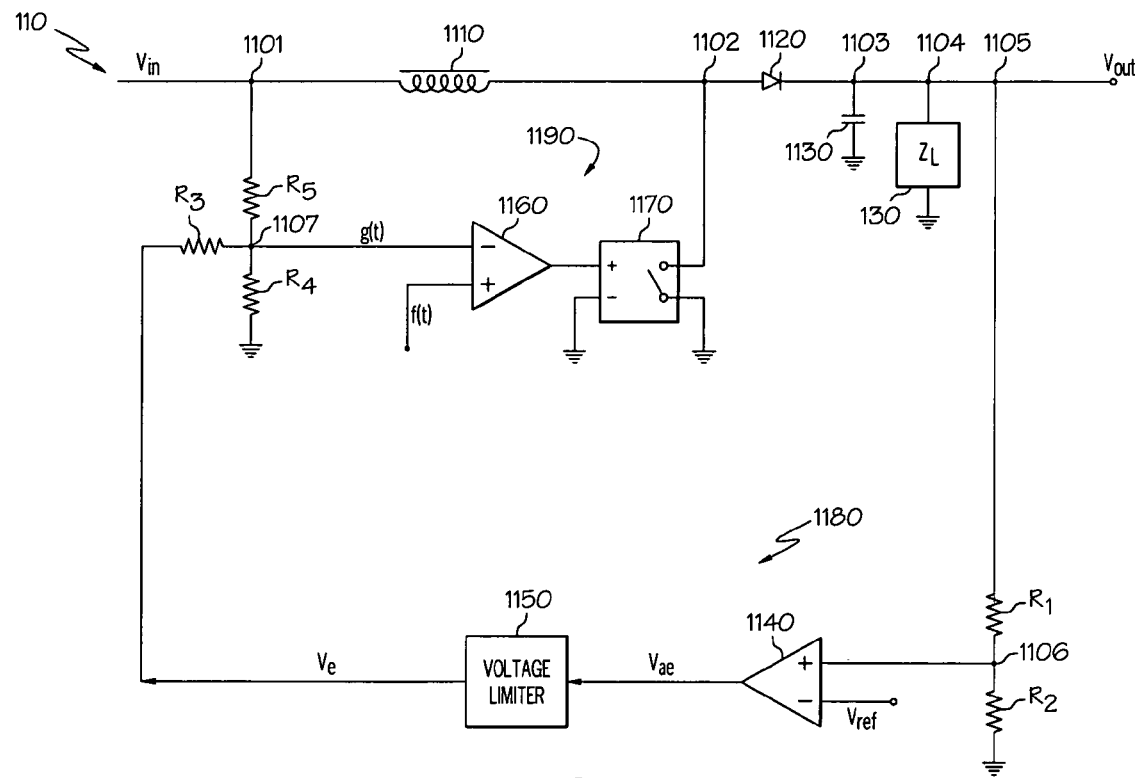
FIG. 2 is a schematic diagram of one exemplary embodiment of a power supply boost circuit included within the display system of FIG. 1.

FIG. 2 is a schematic diagram of one exemplary embodiment of boost circuit 110. In the illustrated embodiment, boost circuit 110 is configured to receive an input voltage ($V_{in}$) from power source 120 and generate a substantially constant, yet greater, output voltage ($V_{out}$).

Boost circuit 110 comprises nodes 1101-1107, inductor 1110, diode 1120, capacitor 1130, error amplifier 1140, voltage limiter 1150, comparator 1160, switch 1170, and resistors R1-R5. Boost circuit 110 is capable of being coupled to power source 120 via node 1102, and is capable of being coupled to load 130 via node 1104.

Node 1101 is coupled to inductor 1110, which is also coupled to node 1102. Node 1102 is coupled to diode 1120, which is further coupled to capacitor 1130 (also coupled to ground) and node 1104 via node 1103. Node 1104 is also coupled to resistor R1 via node 1105, which includes $V_{out}$.

Resistor R1 is coupled to resistor R2 (also coupled to ground) and the positive input of error amplifier 1140 via node 1106. The output of error amplifier 1140 is coupled to and configured to provide an amplified error output voltage ($V_{ae}$) to voltage limiter 1150. Furthermore, the negative input of error amplifier 1140 is coupled to a reference voltage ($V_{ref}$), and error amplifier 1140 is configured to produce $V_{ae}$ based on a comparison of $V_{ref}$ and the voltage at node 1105 (i.e., $V_{out}$).

Figure 3:
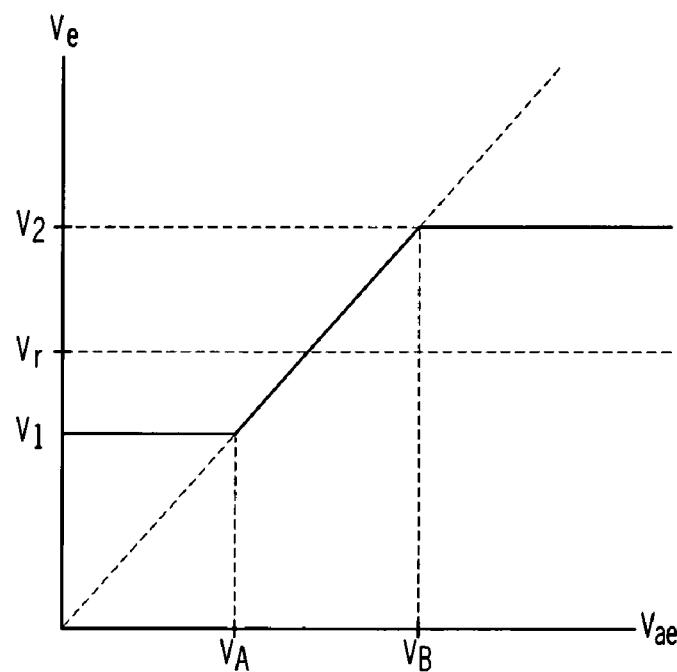
FIG. 3 is a diagram illustrating the output voltage of a voltage limiter included within the power supply boost circuit of FIG. 2.

Voltage limiter 1150 is configured to output an error voltage ($V_e$) within a predetermined range based on the magnitude of received $V_{ae}$. The predetermined range of $V_e$ depends on the application of boost circuit 110 and may include any range of voltages. Specifically, and with reference to FIG. 3, when $V_{ae}$ is a voltage less than or equal to a first predetermined voltage ($V_A$), $V_e$ is a voltage equal to a minimum voltage ($V_1$) within the predetermined voltage range. Similarly, when $V_{ae}$ is a voltage greater than or equal to a second predetermined voltage ($V_B$), $V_e$ is a voltage equal to a maximum voltage ($V_2$) within the predetermined voltage range. Furthermore, when $V_{ae}$ is a voltage between $V_A$ and $V_B$, $V_e$ is a voltage between $V_1$ and $V_2$.

Returning once again to FIG. 2, voltage limiter 1150 is also coupled to resistor R3, which is further coupled to node 1107. Node 1107 is also coupled to resistor R4 (also coupled to ground) and resistor R5, which is further coupled to node 1101. Node 1107 is further coupled to, and supplies an input voltage (g(t)) to the negative input of comparator 1160. The positive input of comparator 1160 is coupled to receive a voltage (f(t)). The output of comparator 1160 is coupled to a switch 1170, and switch 1170 is further coupled to node 1102 and ground.

Switch 1170 is turned ON/OFF according to the output voltage of comparator 1160, which output voltage is dependent on the comparison of g(t) and f(t). Specifically, and with reference to FIG. 4, when f(t) is less than g(t), switch 1170 is switched OFF for the period of time ($t_{off}$). Similarly, when f(t) is greater than g(t), switch 1170 is switched ON for the period of time ($t_{on}$). Notably, resistors $R_1$, $R_2$, $R_3$, $R_4$, and $R_5$, error amplifier 1140, and voltage limiter 1150 form a feedback loop 1180 of boost circuit 110. Resistors $R_3$, $R_4$, and $R_5$, comparator 1160, and switch 1170 form a feed forward loop 1190 of boost circuit 110.

As one skilled in the art will recognize, boost circuit 110 may include numerous configurations that perform the same or similar operations to the circuit discussed above, and that the invention should not be limited to the disclosed circuit configuration, but rather, the invention includes all legal and/or technical equivalents to the disclosed circuit. As such, the following discussion is a mathematical explanation of the operation of boost circuit 110 that may be helpful in understanding not only the specifically disclosed configuration, but various other embodiments of boost circuit 110.

The output voltage $V_{out}$ is proportional to $V_{in}$ multiplied by a time factor. This proportionality can be represented by the following equation:

$$V_{out} \alpha V_{in}(1/(1-D)), \quad (1)$$

where D equals the duty cycle of switch 1170 when switch 1170 is ON ($t_{on}$) divided by the period (T), which is the total time ($t_{on}+t_{off}$) of one cycle of switch 1170.

Now, assuming that the circuit is in a quiescent state so that $V_{out}$ is a relatively stable voltage (represented by the symbol $V_0$), then by simple substitution into equation (1) above it may be seen that $V_0$ is equal to $V_{in}$ multiplied by a time factor represented by the period T divided by the amount of time switch 1170 is OFF ($t_{off}$). This operation can be represented by the following equation:

$$V_r \alpha V_{in}(T/t_{off}). \quad (2)$$

Figure 4:
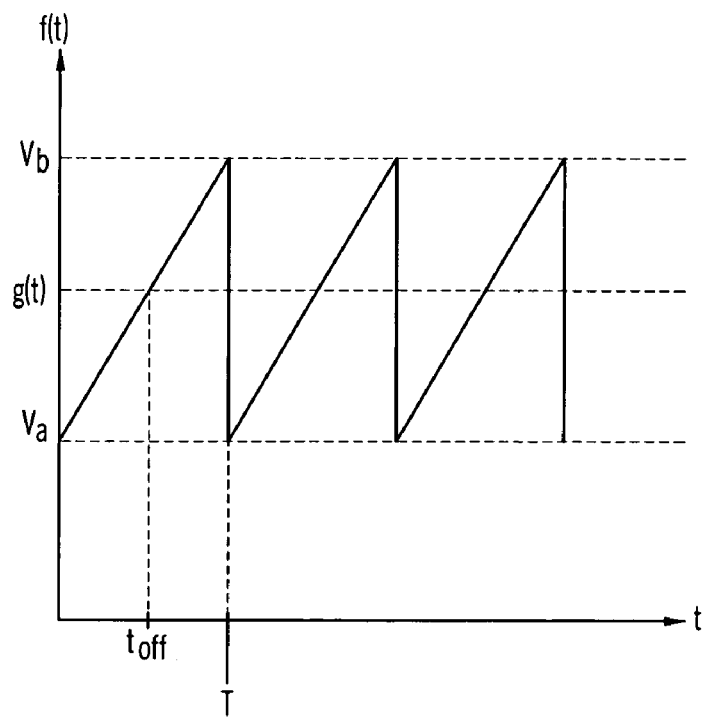
FIG. 4 is a diagram illustrating a timing diagram of a supply voltage included within the display system of FIG. 1.

It is further assumed that the error output voltage $V_e$ produced by voltage limiter 1150 is equal to some nominal voltage $V_r$ (i.e., $V_e = V_r$) and boost circuit 110 is receiving at least a nominal amount of power from power source 120. Then, as depicted in FIG. 4, for $0 \leq t \leq T$, the positive input of comparator 1160 is supplied with a voltage f(t), such that:

$$f(t) = ((V_b - V_a)/T)t + V_a, \quad (3)$$

where $V_a$ is the minimum voltage of f(t) (i.e., the saw tooth signal of FIG. 4) and $V_b$ is the maximum voltage of f(t)

As evident from the schematic of boost circuit 110, the input voltage g(t) provided to the negative input of comparator 1160 is:

$$g(t) = pV_{in} + k, \quad (4)$$

where $p=[(R_4R_3)/(R_4R_3+R_4R_5+R_3R_5)]$ and $k=V_r[(R_4R_5)/(R_4R_3+R_4R_5+R_3R_5)]$. As FIG. 4 also depicts, at $t_{off}$, $f(t_{off})=g(t_{off})$, or $[((V_b-V_a)/T)t_{off}+V_a]=[pV_{in}+k]$.

When $k=V_a$ (i.e., the maximum voltage), then $pV_{in}=((V_b-V_a)/T)t_{off}$, or $t_{off}=[(pTV_{in})/(V_b-V_a)]$. If this equation for $t_{off}$ is then substituted into equation (2) above, it can be shown that $V_{out}$ is proportional to the quantity $(V_b-V_a)/p$, which is a constant value. Mathematically, this can be expressed as:

$$V_{out} \alpha (V_b-V_a)/p. \quad (5)$$

Accordingly, the feed forward loop 1190 of boost circuit 110 compensates for varying voltages in $V_{in}$ and load 130. Likewise, voltage limiter 1150 minimizes the influence feedback loop 1180 has on the operation of boost circuit 110. That is, voltage limiter 1150 compensates for $I^2 \cdot R$ losses in inductor 1110 and $I \cdot V$ losses in diode 1120 while having a minimal impact on variations of the input voltage $V_{in}$ and load 130.

Therefore, boost circuit 110 is stabilized over a wide range of input voltages and load variations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A power supply boost circuit capable of being coupled to a power source and a load, the power supply boost circuit comprising:
    an output node configured to be coupled to the load and to the power source, and for supplying an output voltage ($V_{out}$);
    a feed forward loop configured to be coupled to the load and to the power source; and
    a feedback loop comprising a voltage limiter coupled to the feed forward loop and the output node.

2. The power supply boost circuit of claim 1, wherein the feedback loop comprises an error amplifier having an output coupled to the voltage limiter, a positive input coupled to the output node, and a negative input configured to be coupled to a reference voltage ($V_{ref}$), the error amplifier configured to produce a first output voltage based on a comparison of $V_{ref}$ and $V_{out}$.

3. The power supply boost circuit of claim 2, wherein the voltage limiter is configured to receive the first output voltage and produce a second output voltage within a predetermined range based on the first output voltage.

4. The power supply boost circuit of claim 2, wherein $V_{out}$ is a substantially constant voltage.

5. The power supply boost circuit of claim 2, further comprising:
    an inductor configured to be coupled to the power source;
    a diode coupled to the inductor; and
    a capacitor coupled to the diode and configured to be coupled to the load.

6. The power supply boost circuit of claim 5, wherein the feedback loop is configured to compensate for voltage losses caused by the inductor, the diode, or both.

7. The power supply boost circuit of claim 6, wherein the feed forward loop is configured to compensate for variation in voltage caused by the load, the power source, or both.

8. The power supply boost circuit of claim 2, wherein the feed forward loop comprises:
    a comparator coupled to the voltage limiter and configured to be coupled to the power source; and
    a switch coupled to the comparator and to the load.

9. A power source boost system, comprising:
    a voltage source;
    a power supply boost circuit comprising:
        an output node for supplying an output voltage ($V_{out}$),
        a feed forward loop coupled to the voltage source, and
        a feedback loop coupled to the output node, the feedback loop comprising a voltage limiter coupled to the feed forward loop; and
    a load coupled the voltage source, the output node, and the feed forward loop.

10. The power source boost system of claim 9, wherein the load is an aircraft display.

11. The power source boost system of claim 10, wherein the feedback loop comprises an error amplifier having an output coupled to the limiter, a positive input coupled to the load, and a negative input coupled to a reference voltage ($V_{ref}$), the error amplifier configured to produce a first output voltage based on a comparison of $V_{ref}$ and $V_{out}$.

12. The power source boost system of claim 11, wherein the limiter is configured to receive the first output voltage and produce a second output voltage within a predetermined range based on the first output voltage.

13. The power source boost system of claim 11, wherein $V_{out}$ is a substantially constant voltage.

14. The power source boost system of claim 11, wherein the feed forward loop comprises:
    an inductor coupled to the voltage source;
    a diode coupled to the inductor; and
    a capacitor coupled to the diode and the load.

15. The power source boost system of claim 14, wherein the feedback loop is configured to compensate for voltage losses caused by the inductor, the diode, or both.

16. The power source boost system of claim 15, wherein the feed forward loop is configured to compensate for variation in voltage caused by the load, the voltage source, or both.

17. A method for producing a substantially constant voltage at an output of a power source boost system coupled to a load, the power source boost system including a feedback loop comprising a limiter coupled to the output and a feed forward loop coupled the limiter, the load, and the power source, the method comprising the steps of:
    comparing, via the feedback loop, the constant voltage to a reference voltage; and
    stabilizing the power source boost system over a range of input voltages and load variations,
        wherein the stabilizing step comprises the step of limiting, via the limiter, a voltage supplied to the feed forward loop to a predetermined range of voltages based on the comparing step.

18. The method of claim 17, wherein the stabilizing step further comprises the step of compensating, via the feed forward loop, for voltage variations in the load, power source, or both based on the voltage supplied by the limiter.

19. The method of claim 17, wherein the power source boost system further comprises an inductor coupled to the power source and the feed forward loop, and a diode coupled to the load, the inductor, and the feed forward loop, and wherein the stabilizing step further comprises the step of compensating, via the feedback loop, for losses in the inductor, the diode, or both based on the substantially constant voltage.

* * * * *